L. G. COPEMAN.
GREASE CUP.
APPLICATION FILED OCT. 19, 1918.
1,294,773.     Patented Feb. 18, 1919.
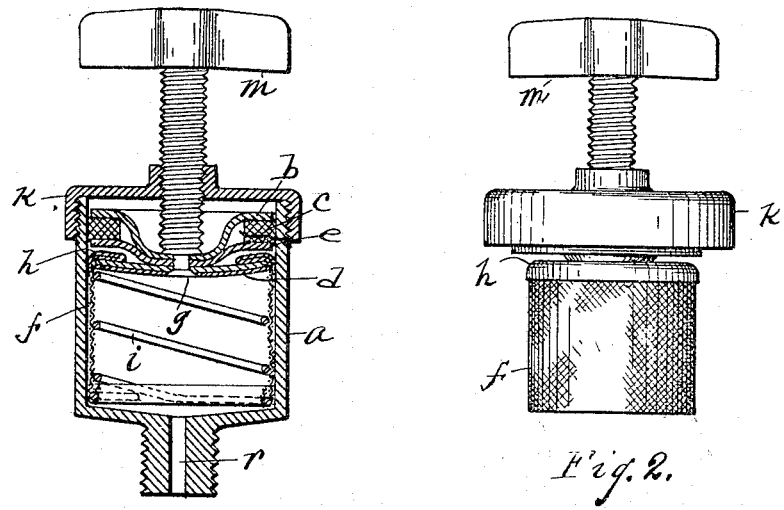
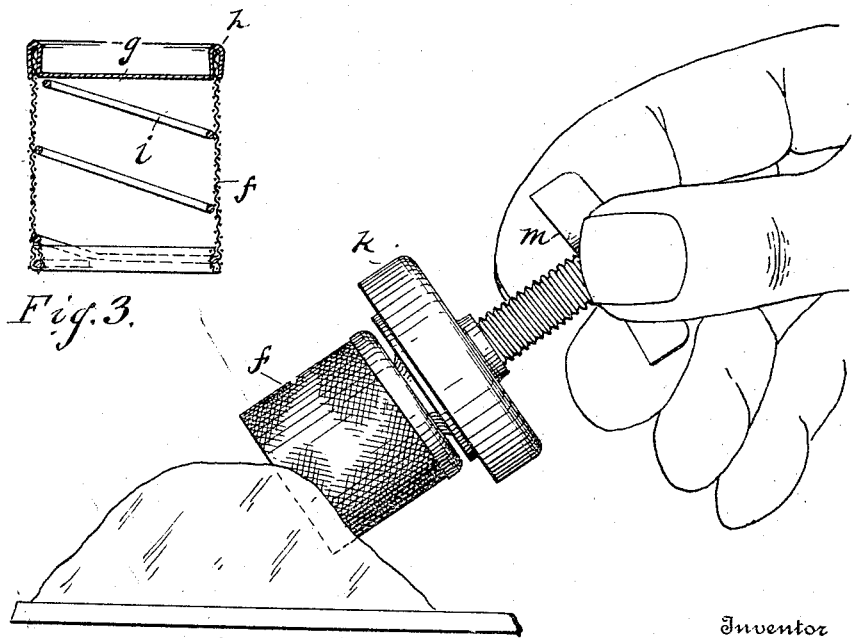
Inventor
Lloyd G. Copeman
By Stuart C. Barnes
Attorney

UNITED STATES PATENT OFFICE.

LLOYD GROFF COPEMAN, OF FLINT, MICHIGAN, ASSIGNOR TO COPEMAN DEVELOPMENT COMPANY, OF FLINT, MICHIGAN, A CORPORATION OF MICHIGAN.

GREASE-CUP.

1,294,773.

Specification of Letters Patent.

Patented Feb. 18, 1919.

Application filed October 19, 1918. Serial No. 258,860.

*To all whom it may concern:*

Be it known that I, LLOYD G. COPEMAN, a citizen of the United States, residing at Flint, county of Genesee, State of Michigan, have invented a new and useful Improvement in Grease-Cups, of which the following is a specification.

This invention relates to grease cups, and has for its object a grease cup provided with a collapsible grease scoop. This scoop is in the form of a collapsible capsule permanently secured to the plunger so that when the grease has been exhausted the cap and plunger may be removed and the capsule or scoop used to scoop up another load of grease for the cup.

In the drawings,—

Figure 1 is a vertical section of the complete cup.

Fig. 2 is an elevation of the plunger with the scoop attached.

Fig. 3 is a longitudinal section of the scoop or dipper.

Fig. 4 is a view showing how the grease is scooped up.

Collapsible capsules and grease cups are old and are exhibited in some of my prior patents. The capsules in these prior patented inventions had to be removed when the grease was exhausted. It is the purpose of this invention to so combine the expelling member with the capsule so that when the grease has been extruded from the cup the expelling member and the capsule may be removed and the two used to scoop up another load of grease to extrude through the grease passageway *r*. I have here illustrated the expelling member in the form of a scoop or plunger, which is my preferred embodiment.

In the drawings, *a* designates the conventional barrel adapted to take an expelling member in the form of a screw-driven plunger *b*. This includes a packing washer *c* and a contact washer *d* between which is an annular space *e* to receive the edges of the scoop *f*. The periphery of this scoop is formed of collapsible material, preferably silk. The closed end *g* may be formed of a variety of materials. For example, I have here shown it formed of a light sheet metal which in conjunction with the sides of the scoop forms a projecting ring portion *h* that may be folded over the end of the contact washer to substantially permanently secure the scoop to the plunger. Within the scoop or capsule there is a fairly stiff coiled spring *i* which serves to keep the capsule distended when the distortion due to confinement between the end of the barrel and the plunger is removed. It must be stiff enough not only to immediately distend the capsule but it must also be able to hold the edge of the capsule or scoop firmly when this member is used as a scoop for the grease, shown in Fig. 4.

Now obviously when the grease is expelled from the barrel the cap *k* and the plunger including the scoop may be removed from the barrel without soiling the hands. The several elements now together as a unit may be handled by touching only the handle *m* and a portion of the screw and the scoop may be dipped in a can of grease or into grease onto a plate or board and a capsule-full taken up without in any way soiling the hands. The loaded scoop may then be replaced in the barrel and the cap *k* screwed back onto the threads of the barrel end. This arrangement secures many of the advantages of a factory-filled capsule without necessitating the expense due to the wastage of capsules.

What I claim is:

1. The combination of a member provided with a grease passage-way, an expelling member adapted to coöperate therewith, and a collapsible scoop united with the expelling member for permanent use and re-filling by scooping with the end of the expelling member.

2. The combination of a member provided with a grease passage-way, an expelling member coöperating therewith, a collapsible scoop substantially permanently secured to the expelling member and provided with means for keeping the scoop distended when relieved of pressure and forced into grease.

3. The combination of a member provided with a grease passage-way, an expelling member coöperating therewith, and a collapsible scoop provided with a spring for keeping the same distended when not under pressure and forced into grease.

4. The combination with a barrel provided with a grease passage-way, a plunger for extruding the contents of the barrel, a collapsible scoop substantially permanently fastened to the plunger, and means for keeping the scoop distended when not under pressure and when forced into grease.

5. The combination of a barrel provided with a grease passage-way, a plunger for extruding the contents of the barrel, a collapsible scoop fastened to the plunger and provided with a spring for keeping the same distended when not under pressure and when forced into grease.

6. The combination of a barrel provided with a grease passage-way, a plunger having an annular recess, a collapsible capsule provided with a projecting ring at the closed end adapted to be turned over to substantially permanently secure the capsule in the annular recess of the plunger, and means for keeping the scoop distended when not under pressure.

In witness whereof I have hereunto set my hand on the 15th day of October, 1918.

LLOYD GROFF COPEMAN.